United States Patent [19]

Roberts

[11] Patent Number: 4,872,079
[45] Date of Patent: Oct. 3, 1989

[54] THIN FILM MAGNETIC HEAD WITH A LEVELER LAYER

[75] Inventor: Gary E. Roberts, Santa Barbara, Calif.

[73] Assignee: Applied Magnetics Corporation, Goleta, Calif.

[21] Appl. No.: 78,911

[22] Filed: Jul. 28, 1987

[51] Int. Cl.$^4$ .................. G11B 5/187; G11B 5/147
[52] U.S. Cl. ......................................... 360/126; 360/122
[58] Field of Search ............................. 360/122, 126

[56] References Cited

U.S. PATENT DOCUMENTS

| | | | |
|---|---|---|---|
| 4,396,967 | 8/1983 | Argumedo et al. | 360/121 |
| 4,422,117 | 12/1983 | Nomura et al. | 361/126 |
| 4,490,760 | 12/1984 | Kaminaka et al. | 360/126 |

FOREIGN PATENT DOCUMENTS 0051123  5/1982  European Pat. Off. .

OTHER PUBLICATIONS

High Track Density Thin Film Tape Heads; IEEE Transactions on Magnetics, vol. Mag-15, No. 3, Jul. 1979, pp. 1130 through 1134, Kenji Kanai, Nobuyuki Kaminaka, Norimoto Nouchi, Noboru Komura and Eiichi Hirota.

*Primary Examiner*—Robert S. Tupper
*Attorney, Agent, or Firm*—Daniel J. Meaney, Jr.

[57] ABSTRACT

A thin film magnetic head having a substrate, a magnetic head and a superstrate formed of materials which are highly resistive to being abraded by a magnetic media being moved thereacross is shown. The magnetic head includes a bottom pole piece having a front gap section and a rearwardly extending portion positioned at predetermined locations on the substrate. The bottom pole piece forms a bottom support for a coil having a plurality of coil windings. An insulating structure having a thin gap defining section and a thick coil windings enclosing portion is located on the bottom pole piece such that the thin gap defining portion establishes the thickness of a magnetic transducing gap and the thick coil windings enclosing portion encloses and surrounds that portion of the coil windings supported by the bottom pole piece. A magnetic top pole piece layer having a front gap portion, a contoured outer surface having a step formed therein, and a rear magnetic closure portion is positioned with the front gap section thereof on the thin gap defining portion of the insulating structure located on the front gap section of the bottom pole piece. The top pole piece extends from the transducing gap rearward to a rear magnetic closure section to enclose that portion of the coil windings located between the top pole piece and the bottom pole piece. A leveler layer is positioned on top of the top pole piece to support a superstrate.

8 Claims, 6 Drawing Sheets

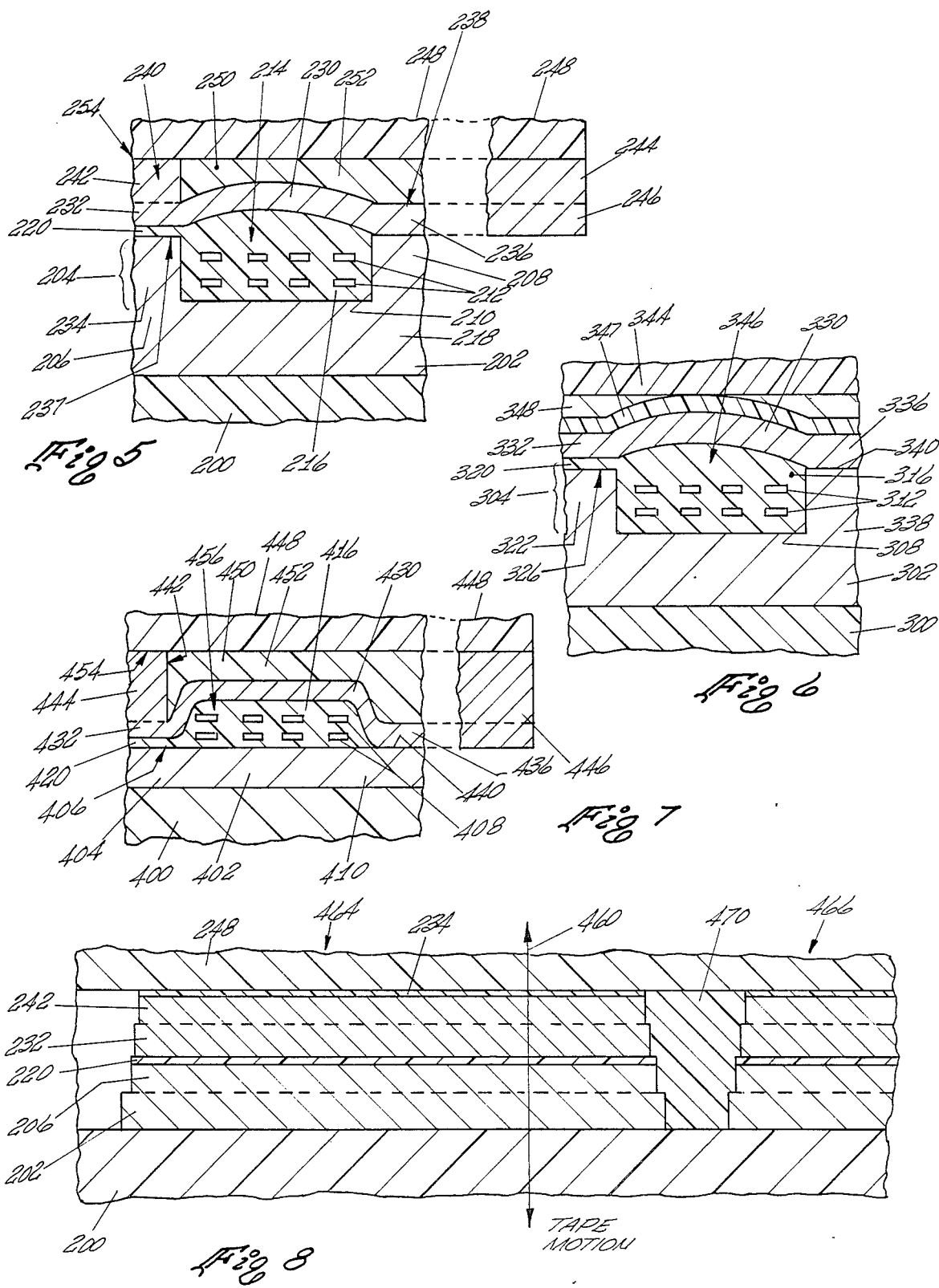

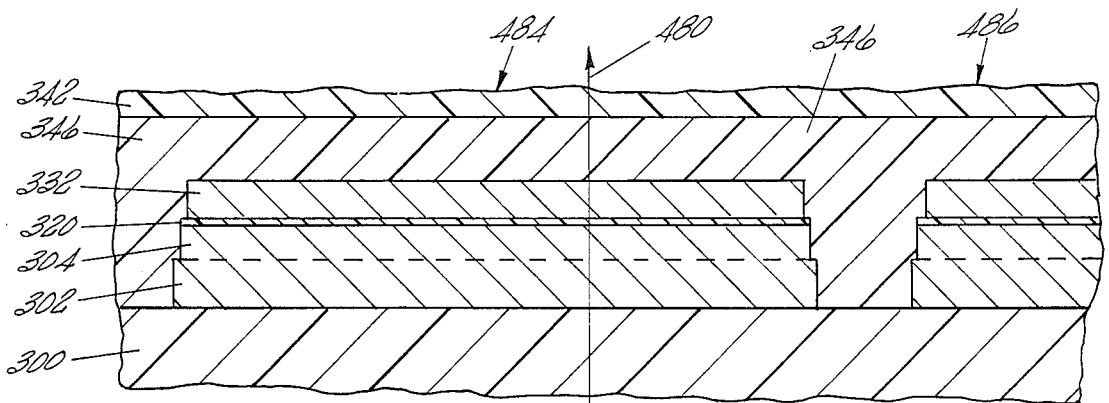
Fig 9
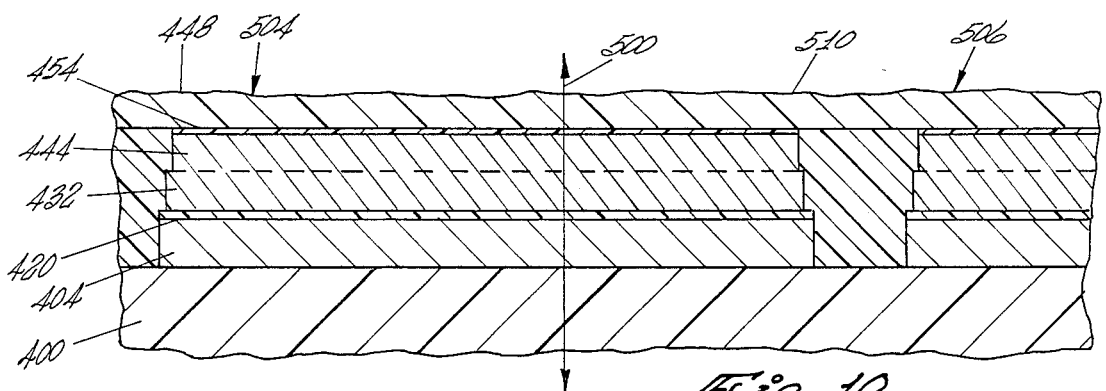
Fig 10
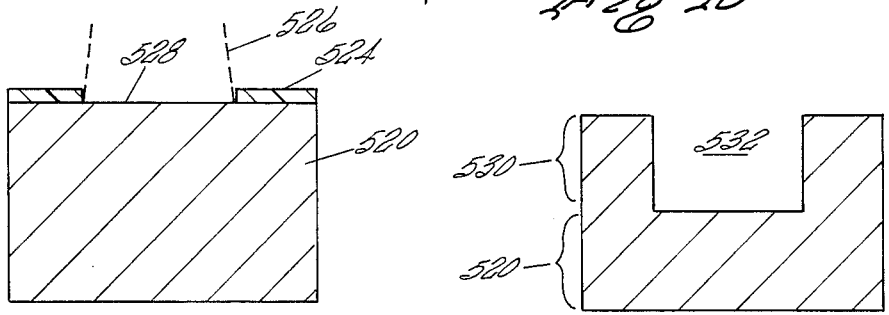
Fig 11A
Fig 11B
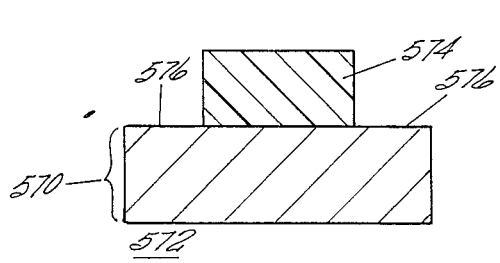
Fig 12A
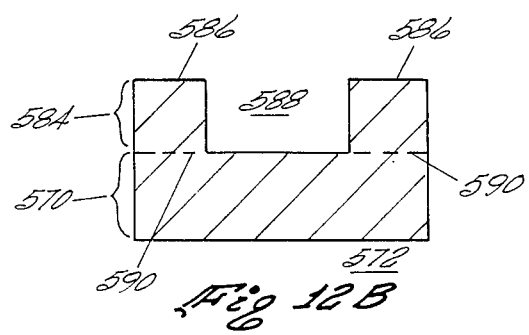
Fig 12B

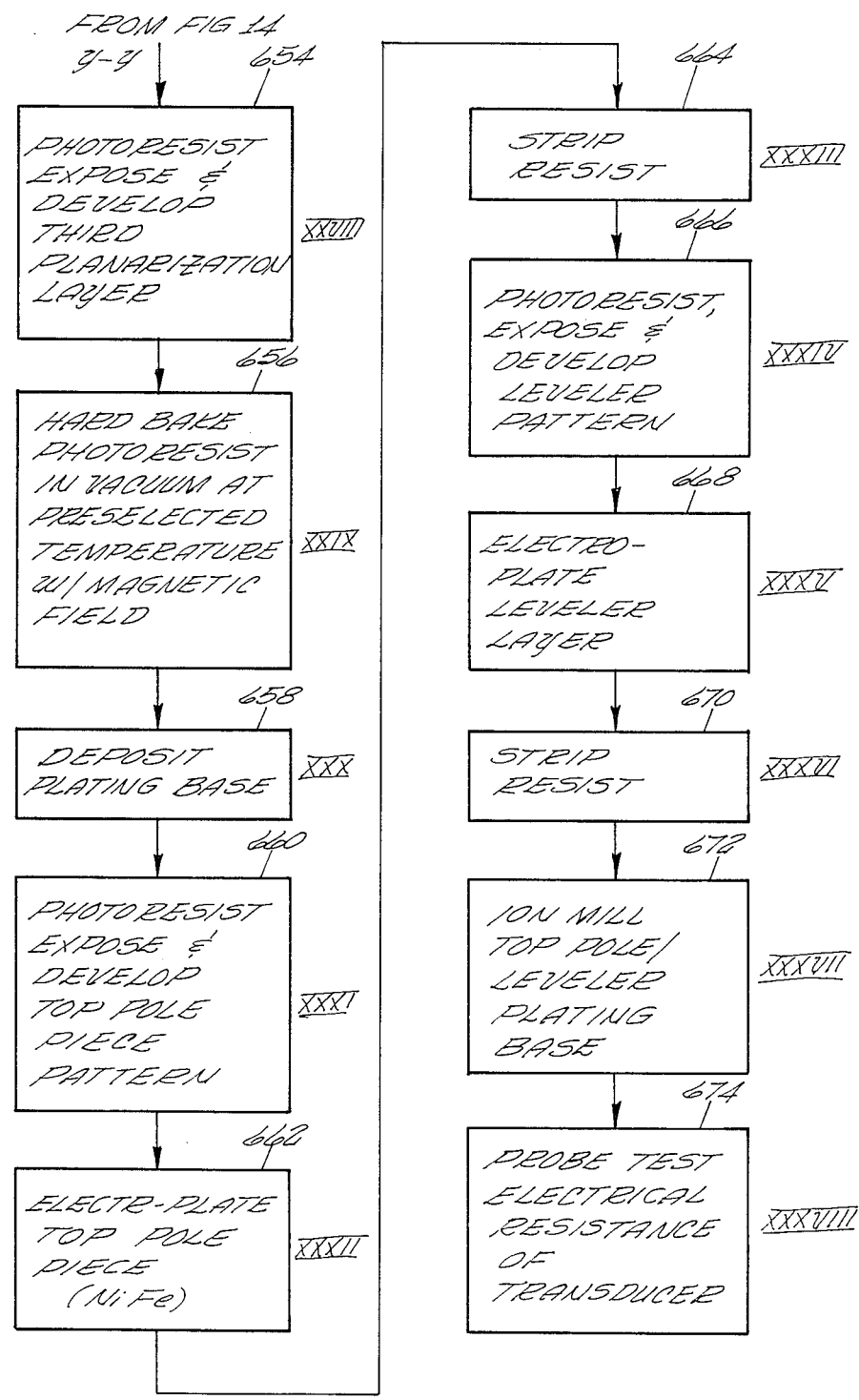

THIN FILM MAGNETIC HEAD WITH A LEVELER LAYER

BACKGROUND OF THE INVENTION

1. Field of the Invention

This invention relates to a thin film magnetic head formed on a substrate having top and bottom pole pieces, coil windings and a superstrate, and more particularily relates to a thin film magnetic tape head assembly which includes an insulating structure having a thin gap defining portion for establishing the thickness of a transducing gap between the top pole piece and bottom pole and a thick coil windings enclosing portion which encapsulates that portion of the coil windings located on the bottom pole piece. A leveler layer is formed on the top pole piece, and a superstrate is placed onto the leveler layer to enclose the contoured outer surface of the top pole piece. The thin film magnetic tape head assembly defines a tape engaging surface that is highly resistent to being abraded by a magnetic tape being moved thereacross. A method for forming the leveler layer and affixing the superstrate thereto is disclosed.

2. Description of the Prior Art.

It is well known in the art to form a thin film magnetic head on a substrate wherein the magnetic head comprises a substrate, top and bottom pole pieces, a coil having multiple windings which may be stacked or located between the pole pieces. A typical thin film head of this structure is illustrated in FIG. 1. of the drawing, and is labeled as "Prior Art". In FIG. 1, the substrate 30 has a deposited bottom pole piece 32 which is relatively planar in shape, and one end thereof, front gap section 34, which defines one side of a transducing gap 40. A deposited planarized coil having a plurality of coil windings, shown generally as 42, is encapsulated in an insulating layer 44. A portion of the insulating layer 44 defines the thickness of the transducing gap 40. A deposited top pole piece 46 located on the insulating layer 44 has a front gap section 48 that defines the other side of the transducing gap 40 and the other end is contiguous the rearwardly extending portion of the bottom pole piece to form a rear magnetic closure section 49. An overcoat layer 50, formed of a material that will conform to the contoured stepped outer surface 52, is deposited on the top pole piece 46. An adhesive or filler layer 58 is then applied over the overcoat layer 50 to form a relatively planar surface for supporting a superstrate 59. A magnetic tape, shown as tape 54, is transported across the thin film magnetic head to coact with the magnetic pole pieces 32 and 46 and the transducing gap 40.

EPO Publication No. 0,051,123 discloses a magnetic transducer having top and bottom substrates formed of a magnetic material, which function as the pole piece, with a deposited thin film coil between the pole pieces.

In another known prior art, a ferrite magnetic head illustrated in FIG. 2, has a thick magnetic pole piece 60, formed of a ferrite material, which has a slot 62 formed therein and which is filled with a glass material 64. The glass material 64 placed in the slot 62 functions to receive and support a sprial coil having coil windings 66, which are, in turn, encapsulated in an insulating structure 74. The combination of the slot, glass and coil windings function to physically impose a separation between the pole pieces. As shown in FIG. 2, the thick ferrite pole piece 60 has one end 70 thereof defining one side of a transducing gap 72, which gap is filled by an insulating material 68 which is part of an insulating layer 74. A top pole piece 76, which typically is a deposited magnetic layer, has one end thereof, end 78, defining the other side of the transducing gap 72. Also, a rear magnetic closure section 88 is formed rearward of the transducing gap. A protective overcoat layer 80 formed of a material that will conform to the contoured stepped outer surface of the top pole piece 76, is deposited onto the top pole piece 76. An adhesive or filler layer 81 is then applied over the overcoat layer 50 to form a relatively planar surface to receive a superstrate 86. A magnetic tape 84 is transported across the tape engaging surface 86 of the thin film magnetic head.

One specific prior art thin film magnetic head using this structure is disclosed in Kaminaka et al. U.S. Pat. No. 4,490,760. U.S. Pat. No. 4,490,760 also discloses use of a glass filled slot on the media engaging surface.

A thin film head having a glass filled slot, similar to that disclosed in U.S. Pat. No. 4,490,760, is discussed in an article captioned "High Track Density Thin-Film Tape Heads" which appeared in the IEEE Transactions on Magnetics, Volume Mag-15, No. 3, July 1979 at pages 1130 through 1134, wherein the authors are Kenji Kanai, Nobuyuki Kaminaka, Norimoto Nouchi, Noboru Nomura and Eiichi Hirota (the "Kanai et al. Publication"). In the Kanai et al. Publication, reference is made to FIG. 2 thereof which shows a protective cover placed over a contoured pole piece exposing an area adjacent the transducing portion "A" of the top pole piece. This is referred to as a "large step structure". As noted in the Kanai et al. Publication, a "large step structure" is undesirable.

The Kanai et al. Publication also teaches the concept of a slot being formed in the bottom pole piece, and filling the same with glass. This results in effectively separating the bottom pole piece from the top pole piece. A deposited thin film coil is formed on the glass filled slot. A top pole piece is then deposited onto the thin film coil. This result is a "small step" in the region between the protective layer and the transducing portion "A" of the top magnetic layer. The effect of the "small step" is to reduce the undesirable surface area which forms a portion of the tape engaging surface. This is shown in FIG. 4 of the Kanai et al. Publication.

As is readily apparent from the Prior Art thin film magnetic head assemblies of FIGS. 1 and 2, the magnetic media engaging surface is formed of a plurality of different materials that are subjected to being abraded by the moving magnetic media. It is well known in the art that different materials, when abraded by a magnetic media being transported thereacross, abrade at different rates. In magnetic tape heads, uneven abrading of materials due to a magnetic tape being transported thereacross can result in the formation of grooves at various material boundaries, or otherwise result in the flaking off or smearing of the abraded material along the tape engaging surface.

U.S. Pat. No. 4,422,117 discloses a thin film head having a glass filled slot in the bottom pole piece for supporting a deposited thin film coil. A thin film pole piece is then deposited onto the deposited coil. A superstrate is applied to the contoured top pole piece by means of glass bonding. This results in glass being located on, and forming part of, the tape engaging surface between the superstrate and the contoured top pole piece.

U.S. Pat. No. 4,396,967 discloses a deposited thin film head wherein glass filled slots are formed in a thin ferrite layer affixed to a non-magnetic Barium Titanate Ceramic (BTC) support piece defining one side of a magnetic head structure. A thin ferrite layer is formed on a second BTC support piece which defines the other side of the magnetic head structure. The other BTC support piece has individual coil winding slots formed therein, which, in turn, contain individual coil windings. When the two BTC support pieces are assembled, the glass filled slots mate with the ferrite containing the coil windings in the slot such that the coil windings are enclosed by, and recessed within, the thin ferrite layer. In this structure, the two thin ferrite layers form part of the media engaging surface in the vicinity of the transducing gap.

SUMMARY OF THE PRESENT INVENTION

The present invention relates to a new and novel thin film magnetic tape head assembly wherein the magnetic pole pieces are both formed of deposited layers of magnetic material and wherein the coil windings, forming a coil for the head assembly, are integrated within the head structure such that the magnetic pole pieces and other different materials that typically are subject to being abraded by a magnetic tape being transported across the tape engaging surface of the head assembly have the wearing thereof minimized due to the tape engaging surface an having an improved resistance to being abraded by the magnetic tape. The so formed thin film magnetic tape head has greatly improved wear characteristics so that life of the thin film magnetic tape head is increased.

The thin film magnetic tape head assembly of the present invention includes a substrate having a deposition surface and an end surface which is substantially perpendicular to the deposition surface. The substrate is formed of a material which is highly resistive to being abraded by a magnetic tape being moved thereacross. The substrate has a tape engaging surface defined at a predetermined position on the end surface thereof. A magnetic bottom pole piece layer is located on the deposition surface of the substrate, and the bottom pole piece layer has a front gap section and a rearwardly extending portion. The front gap section thereof is positioned adjacent the end of the substrate defining the tape engaging surface. The rearwardly extending portion of the the magnetic bottom pole piece is located rearward of and in a spaced opposed relationship from the front gap section and from the tape engaging surface.

A coil, which in the preferred embodiment is a multiplanar coil, having a plurality of coil windings is formed on the bottom pole piece. The coil has a portion of the coil windings located between the top pole piece and the bottom pole piece and the remaining portion thereof extends on the rearward portion on the bottom pole piece.

An insulating structure has a thin gap defining portion and a thick coil windings enclosing portion. The thin gap defining portion of the insulating structure is formed of predetermined thickness and is located between the front gap section of the top pole piece and the bottom pole piece to establish the thickness of the magnetic transducing gap. The thick coil windings enclosing portion is positioned to enclose and surround that portion of the coil windings enclosed between the top pole piece and the bottom pole piece.

A magnetic top pole piece layer having a front gap section and a step formed in the contoured outer surface is positioned on the insulating structure with the bottom surface thereof extending from the front gap section to the rear magnetic closure section on the rearwardly extending portion of the bottom pole piece. The top pole piece forms a top enclosure for the coil windings and the the bottom pole piece layer forms the bottom enclosure. The media engaging edge of the top pole piece is located adjacent the front gap section of the bottom pole piece and is in spaced opposed parallel relationship with the media engaging surface of the bottom pole piece to define a transverse tape engaging surface thereacross.

A leveler layer, having a thickness which is slightly greater than the "step" of the top pole piece, is formed on the top pole piece layer.

The "step" of the top pole piece generally refers to the geometrical displacement or height of the thin film deposited pole piece at the location where the same is deposited over a coil. The result is that the outer surface of the top pole piece is contoured resulting in a "step" being formed on that part of the top pole piece rearward of the transducing gap.

The leveler layer has a forward leveler section located adjacent the front gap section of the top pole piece layer, and a rearward leveler section located at predetermined distance from and rearward of the front gap section of the top pole piece layer. A superstrate having a relatively planar support surface is placed on the forward leveler section and rearward leveler section and leaves a space between the relatively planar support surface of a substrate and the contoured outer surface of the top pole piece layer. This space is remote from and rearward of the tape engaging surface.

The known prior art magnetic tape heads have the disadvantage of having significant portions of the tape engaging surface fabricated from materials that are not highly resistive to being abraded by a magnetic media being transported thereacross. In the Prior Art magnetic head illustrated in FIG. 1, the protective overcoat layer and the adhesive filler, and to a lesser extent the insulating material in the gap, is exposed to and abraded by a moving magnetic media. Further, the materials used for the substrate, the superstrate, and for adhering the superstrate to the top magnetic pole piece have different abrading characteristics resulting in a number of different materials defining the tape engaging surface.

FIG. 2 of the EPO Publication No. 0, 051,123 and U.S. Pat. Nos. 4,490,760 and 4,396,967 disclose magnetic head structures wherein the protective layer or overcoat layer, fabricated from soft material, form part of the tape engaging surface. The amount of soft material present on the tape engaging surface affects the magnetic tape head life due to the soft materials eroding at a higher rate than the other materials likewise forming part of the tape engaging surface. The dissimilar materials defining the tape engaging surface are eroded at different rates when abraded by a magnetic media being transported thereacross, and if the softer materials abrade at a significantly higher rate, the life and performance characteristics of the magnetic head are directly affected.

Typically soft materials used in the assembly of the magnetic head, i.e. epoxies or adhesives, will easily smear and erode causing a condition known as a "washout" of the eroded material. This condition occurs as a result of the edges of the soft material, which are located adjacent a harder material, i.e. an epoxy adhesive adjacent a ferrite pole piece, wearing in an uneven manner. This uneven abrading typically results in a "groove" being formed at the boundary of the dissimilar materials. The so formed "groove" then becomes filled with debris which is carried to the "groove" by the moving magnetic media. As the "groove" becomes filled with material, a raised rib forms thereacross which causes the tape to be lifted off the tape engaging surface forming a wear point. The result is that the tape is urged away from the transducing gap reducing the efficiency of the magnetic media-to-head contact. Also, the debris accumulated in the so formed "groove" may flake off, may become imbeded in the magnetic media, or may scratch the surface of the magnetic media, all of which are highly undesirable.

In magnetic tape head applications using a magnetic head structure described above, the magnetic tape head life is determined by: (1) the wear characteristics of the softest material of the assembly which forms part of tape engaging surface exposed to being abraded by the magnetic tape, or (2) the ability of the softest material to be resistive to being abraded by a moving magnetic tape.

The present invention overcomes several of the disadvantages associated with the prior art magnetic heads. One advantage of the present invention is that the materials used for fabricating the substrate and superstrate are formed of a material, such as for example ceramic Aluminum Oxide-Titanium Carbide or ceramic Silicon Carbide, which is highly resistive to being abraded by a magnetic tape being transported thereacross.

Another advantage of the present invention is that a leveler layer can be placed on top of the top pole piece and a superstrate can be placed onto the leveler layer. This results in a small, thin glue line, or adhesive line, being present between the leveler layer and superstrate at the tape engaging surface. As a result, the abrading effect on the thin glue line, or adhesive line, is minimized, thereby increasing the magnetic tape head life because substantially all of the tape engaging surface is more resistive to being abraded by a moving magnetic tape.

Another advantage of the present invention is that the formation of the unwanted grooves in the tape engaging surface, associated with the prior art, is avoided thereby from the tape engaging surface. As a result, improved magnetic tape head-to-tape contact and better head-tape performance characteristics are obtained.

Another advantage of the present invention is that magnetic tape heads using thin film magnetic head assemblies having smaller transducing gaps and extremely small adhesive lines can be fabricated, using the teachings of the present invention enabling such magnetic tape heads to take advantage of the characteristics of thin film transducers. Such magnetic head assemblies can be used in multitrack, high density, tape recording applications. Such magnetic head assemblies will have improved operating characteristics and enhanced magnetic tape head life.

Another advantage of the present invention is that the thin film magnetic head assembly formed by using the teachings of the present invention can be used to fabricate a multitrack, magnetic tape head for use in high tape speed, high density recording applications. One example of such an application is an 18 track magnetic tape head that can be used in a high density, tape storage system such as the IBM Model 3480 tape storage system.

Another advantage of the present invention is that coil windings, which are located in the coil windings receiving trench formed in the lateral layer, can be a spiral wound coil, a helical wound coil, or a single or multiplanar or multiple layer coil or the like.

Another advantage of the present invention is that the apparent overall thickness of the top and bottom pole pieces used to define the tape engaging surface can be made symmetrical or the geometrical dimensions thereof, such as the thickness of the pole piece layer, can be controlled. This is accomplished by controlling the thickness of the bottom pole piece and lateral wall layer during the deposition or plating process, and then controlling the thickness of the leveler layer deposited or plated onto the top pole piece.

Another advantage of the present invention is that the overall thickness of the bottom pole piece, including the depth of the coil windings receiving trench formed therein, can be precisely controlled by controlling the thickness of the lateral layer during the deposition of the same onto the bottom pole piece. In the alternative, the thickness of the bottom pole piece can be controlled during the deposition or plating process to form a thick layer film of magnetic material, and then controllably removing, by means of a mask and an ion beam, a selected center section of the material of the thick film pole piece to form a central trench therein which functions as the coil windings receiving trench.

Another advantage of the present invention is that the pole piece used in practicing this invention can have dimensions, that is pole face thicknesses, in the order of about 5 microns to about 25 microns, depending on the desired operating characteristics of the magnetic tape head. In the preferred embodiment, the desired range would be in the range of about 8 microns to about 15 microns.

Another advantage of the present invention is that the substrate and superstrate can be fabricated from a relatively hard material such as ceramic Silicon Carbide [SiC] or ceramic Aluminum Oxide-Titanium Carbide [Al$_2$O$_3$-TiC]. The pole pieces, lateral layer and leveler layer used in practicing this invention can be fabricated from nickel-iron; and the boundary between the lateral layer and bottom pole piece would be non-existent. The thin gap defining material can be Al$_2$O$_3$, and have a dimension in the order of about 1 micron or less. The glue line or adhesive line between the leveler layer and superstrate can be in the order of 5 microns or less and in the preferred embodiment is in the order of 1 micron.

Another advantage of the present invention is that a thin film magnetic tape head can be fabricated having a lateral wall layer defining a coil windings receiving trench alone. Alternatively, a thin film magnetic head can be fabricated having a lateral wall layer defining a coil windings receiving trench and a leveler layer, located on the top pole piece, to support a planar superstrate.

DESCRIPTION OF THE DRAWINGS

These and other advantages of the invention will be readily apparent when considered in light of the detailed description hereinafter of the preferred embodiment and when considered in light of the drawing set forth herein which includes the following Figures:

FIG. 5 is a partial pictorial representation, in cross-section, of one embodiment of a thin film magnetic transducer having a substrate for supporting a bottom pole piece layer with a coil windings receiving trench formed therein, a deposited top pole piece, a leveler layer deposited onto the top pole piece and a superstrate;

FIG. 6 is a partial pictorial representation, in cross-section, of another embodiment of a thin film magnetic head having a substrate for supporting a bottom pole piece layer with a coil windings receiving trench formed therein, a deposited top pole piece and a superstrate;

FIG. 7 is a partial pictorial representation, in cross-section, of yet another embodiment of a thin film magnetic head having a substrate for supporting a bottom pole piece layer, coil windings deposited onto the bottom pole piece, a deposited top pole piece, a leveler layer deposited onto the top pole piece and a superstrate;

FIG. 8 is a partial pictorial representation, in cross-section, of the tape engaging surface including the magnetic transducing gap of the embodiment of the thin film magnetic head illustrated in FIG. 5 hereof;

FIG. 9 is a partial pictorial representation, in cross-section, of the tape engaging surface including the magnetic transducing gap of the embodiment of the thin film magnetic head illustrated in FIG. 6 hereof;

FIG. 10 is a partial pictorial representation, in cross-section, of the tape engaging surface including the magnetic transducing gap of the embodiment of the thin film magnetic head illustrated in FIG. 7 hereof;

FIGS. 11 A and 11 B are pictorial representations of (i) a deposited, thin film bottom pole piece having an ion milling mask placed thereon, and (ii) a lateral wall layer defining a coil windings receiving trench formed by ion beam removal of a controlled portion of the bottom pole piece material to form the same, respectively;

FIGS. 12 A and 12 B are pictorial representations of (i) a partially deposited, thin film bottom pole piece having a mask placed thereon to prevent further material from being deposited on a selected area of the partially deposited pole piece, and (ii) a lateral wall layer defining a coil windings receiving trench formed by having a selected area of the bottom pole piece masked to prevent deposition of the bottom pole piece material to form the same, respectively; and FIGS. 13, 14 and 15 are a series of block diagrams depicting the various steps of method for forming the thin film magnetic tape head illustrated in FIG. 3 hereof.

DESCRIPTION OF THE PREFERRED EMBODIMENT

Figure 1:
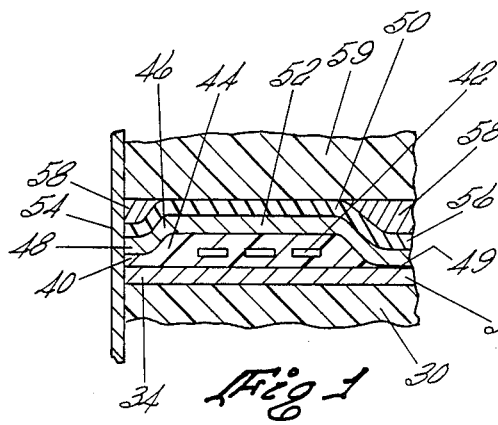
FIG. 1 is a diagrammatic illustration of a Prior Art thin film magnetic head having a pair of deposited pole pieces which enclose a deposited coil having a plurality of coil windings.
Figure 2:
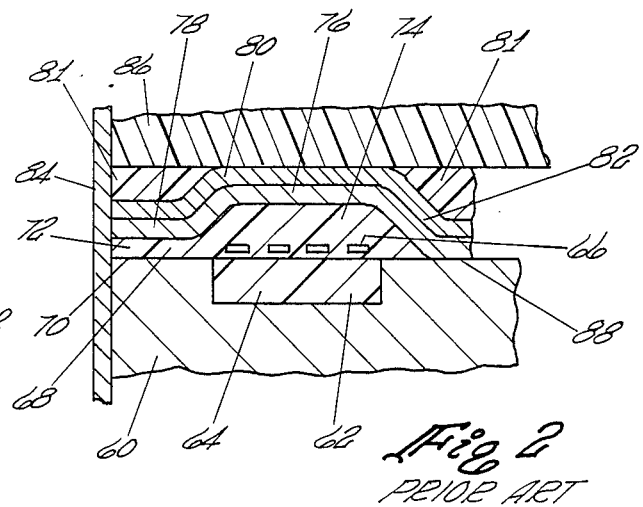
FIG. 2 is a diagrammatic illustration of a Prior Art magnetic head having a bottom pole piece formed from a ferrite material, wherein the bottom pole piece has a glass filled slot to receive and support a coil having a plurality of coil windings, and a deposited top pole piece encloses the coil windings.

As described hereinbefore, the thin film magnetic head shown in FIGS. 1 and 2 are Prior Art magnetic heads having deposited top pole pieces. During the deposition process, the top pole piece has a contoured outer surface having a step such that the physical shape taken by the deposited layer varies from the forward gap section, which functions as the other side of a magnetic transducing gap, to the center of the layer. The center of the layer, which encloses the coil windings, defines the "step" and the height thereof. The rear portion of the top pole piece is referred to as the rear magnetic closure portion of the top pole piece and forms part of a rear magnetic closure section. As is apparent from the illustration of FIGS. 1 and 2, the protective overcoat must conform to the step of the contoured outer surface of the top magnetic pole piece.

In the Prior Art magnetic heads, the thick filler material located between the protective overcoat and the superstrate, as well as the protective overcoat itself, are engaged by and abraded by the moving magnetic media. The large area of the adhesive or filler and the thickness of the protective overcoat result in a disadvantage of the Prior Art magnetic heads overcome by the teachings of this invention.

The protective overcoat material, typically formed of such materials such as sputtered $SiO_2$ or $Al_2O_3$, is softer than the materials used to fabricate the other elements of the magnetic head, with the exception of plated NiFe. An adhesive or filler layer is used to fill the gap between the tope pole piece and the superstrate. The adhesive or filler layer 58 in FIG. 1 and 81 in FIG. 2 form part of the tape engaging surface of the magnetic head. As a result, the softer materials used for the protective overcoat and adhesive or filler layer are subject to eroding when engaged by a moving magnetic media.

In certain other implementations, a superstrate with a planar support surface, and a bonding material, such as glass, adhesive or epoxy are used between the superstrate and the top pole piece to bond or join the same together. As a result, the bonding material forms a thick or wide line or width of yet another dissimilar material that is placed into the tape engaging surface. Such material is abraded by the magnetic tape being transported thereacross resulting in the disadvantages described in detail hereinabove.

Thin film magnetic heads generally, and thin film magnetic tape heads specifically, are used in applications having high density recording and reproducing rates, say in the order of 19,000 Bits Per Inch (BPI), and in the order of 25,000 Flux Reversals Per Inch (FRPI). In certain thin film magnetic tape head applications, the magnetic tape may be moved across the tape head at speeds in the order of 80 inches per second or more. Thus, the problem of abrading of the thin film magnetic tape head by the magnetic tape directly affects the operating characteristics and life of the thin film magnetic tape head. In order to solve these problems, the fabrication of the thin film magnetic heads is now being directed to structures formed of materials which are highly resistive to being abraded by a magnetic tape being transported thereacross.

Thin film magnetic heads have relatively thin magnetic gaps, say in the order of one micron or less, and the material used in a gap is abraded by the magnetic tape moving thereacross. However, the cross-sectional area of a thin film gap is very small compared to the overall cross-section area of the tape engaging surface. As a result, the wear life of a thin film magnetic head is greatly improved when the structure of the magnetic head is formed of elements which have improved characteristics so as to be resistive to being abraded.

Figure 3:
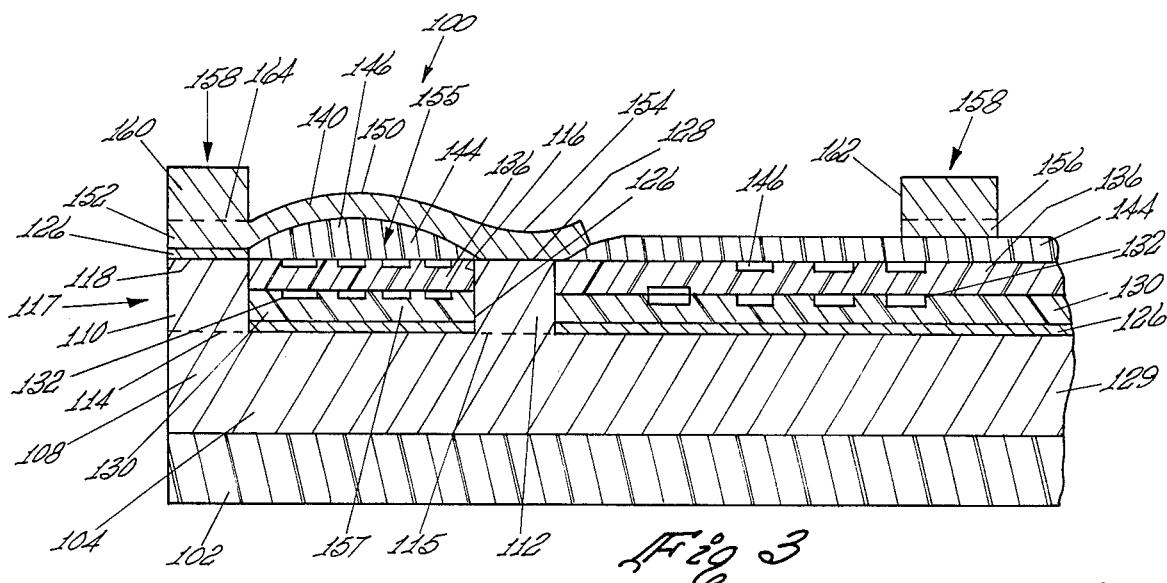
FIG. 3 is a pictorial representation, in cross-section, of a thin film magnetic tape head having a coil windings receiving trench defined by a lateral wall layer and having a leveler layer deposited onto the top pole piece and a rearward support section for supporting a superstrate.

The embodiment of the thin film magnetic head illustrated in FIG. 3 is shown without a superstrate being affixed to the thin film head assembly. The magnetic head structure is formed to provide a tape engaging surface that is highly resistive to being abraded by a magnetic tape. In the structure of FIG. 3, the thin film magnetic tape head, shown generally as 100, has a substrate 102 formed of a material which is highly resistive to being abraded by a magnetic media being moved thereacross. Typical materials that may used for the substrate are ceramic $Al_2O_3$-TiC, ceramic SiC or other similar materials that are highly resistive to being abraded.

A magnetic bottom pole piece layer 104, which in the preferred embodiment is a chemically plated pole piece, is located on the substrate 102. In the embodiment illustrated in FIG. 3, the thickness of the deposited pole piece is in the order of about 5 microns to about 25 microns, depending on the application. The preferred range is in the order of about 8 microns to about 15 microns. The pole piece material may be a Nickel-Iron alloy material having in the order of 81% nickel and 19% iron. The bottom pole piece layer 104 has a lateral wall layer 117 having a continuously deposited (i.e. no apparent boundary exists between the bottom pole piece 104 and the lateral wall layer 117) forward wall section 110 and a continuously deposited rearward wall section 112 with the forward wall section 110 positioned at a predetermined location on the substrate 102. The dashed lines 114 and 115 illustrate the portions thereof which form the wall sections 110 and 112, but no discrete boundary layer exists between the wall sections 110 and 112 and the bottom pole piece 104. The rearward wall section 112 is located rearward of and extends in a spaced opposed relationship from the forward wall section 110.

The lateral wall layer 117, formed of a magnetic material, is formed on or as part of the bottom pole piece layer 104. The lateral wall layer 117 is formed of predetermined thickness and is positioned on and forms an integral part of the bottom pole piece layer 104. Two methods for forming lateral wall layer 117 and the coil windings receiving trench are discussed in connection with FIGS. 11 A, 11 B, 12 A and 12 B.

The forward wall section 110 and a rearward wall section 112 defining a coil windings receiving trench 116 therebetween.

The forward wall section 112 of the lateral wall layer 117 is located on the bottom pole piece 104 with the forward wall section 112 establishing one side of a transducing gap 118. The rearward wall section 112 is positioned a predetermined distance rearward from the front wall section 110 and contiguous the rearward wall section 112 forming one side of a rear magnetic closure section 128. This results in the coil windings receiving trench 116 being positioned on the bottom pole piece 104 near the front wall section 110. The bottom pole piece 104 forms a bottom enclosure for the coil windings receiving trench 116.

The following description relates to the structure of the various layers that are deposited into the combined pole piece 104—lateral wall layer 117 described hereinbefore, to form the thickness of the transducer gap 118 and to define an insulating structure for enclosing the coil windings, both within the coil windings receiving trench 116 and on the rearwardly extending portion 129 of the bottom pole piece 104. The coil may comprise a single layer coil having a plurality of coil windings or may comprise a multiplanar coil having a plurality of coil windings.

An insulating layer of $Al_2O_3$, shown as layer 126, is sputtered on the entire subassembly. That portion of the sputtered layer located on tope of the rearward wall section 112 is removed and the sputtered insulation layer 126 remains on top of the forward wall section 110, on that portion of the bottom pole piece 104 defining the bottom of the coil winding receiving trench 116 and on the rearwardly extending portion 129 of the bottom pole piece 104.

A first layer of photoresist 130 is then deposited onto the insulating layer 126 to support the first layer of coil windings 132 of that portion of the multiplanar coil winding located in the coil windings receiving trench 116, which coil windings 132 likewise extend to the rearwardly extending portion 129 of the bottom pole piece 128.

A portion of the first photoresist layer 130 is located in the coil windings receiving trench 116 and a portion thereof is located rearward of the rearward wall section 112. The first layer coil winding 132 is supported by the first photoresist layer 130, both within the coil windings receiving trench 116 and over the rearwardly extending section 129 of the bottom pole piece.

A second photoresist layer 136 is deposited onto the first layer of the coil windings 132 and the first photoresist layer 130 to enclose the first layer of coil windings 132.

A second layer of coil windings 140 is formed on the second photoresist layer 136, both within the coil windings receiving trench 116 and over the rearwardly extending portion of the bottom pole piece 129.

Thereafter a third photoresist layer 146 is deposited onto the second layer of coil winding 140, both within the coil windings receiving trench 116 and over the rearwardly extending portion 129 of the bottom pole piece 128.

The above is referred to hereinafter as the "insulating structure", which in FIG. 3 is shown generally as 155, and, that the portion of the insulating structure defining the thickness of the magnetic transducing gap is referred to herein as the "thin gap defining portion", which in FIG. 3 is shown generally as 126, of the "insulating structure" 155. The portion of the "insulating structure" enclosing the multiplanar coil windings between the top and bottom pole pieces is referred to herein as the "thick coil windings enclosing portion," which in FIG. 3 is shown generally as 157, of the insulating structure 155.

A deposited magnetic top pole piece layer 150 has a front gap section 152 and a rear magnetic closure portion 154. The front gap section 152 of the top pole piece 150 is positioned on the thin gap defining portion 126 of the insulating structure and adjacent the front wall section 120 of the lateral wall layer 117 which is contiguous with the front gap portion 114 of the bottom pole piece layer 104 establishing the transducing gap 118. The rear magnetic closure portion 154 of the top pole piece 150 is contiguous the rearward wall section 112 at a location rearward of and spaced from the transducing gap 118, to form the other side of the rear magnetic closure section 128. The bottom surface of the top pole piece layer 150 bridges the forward wall section 116 and the rearward wall section 112 of the lateral wall layer forming a top enclosure for the coil windings receiving trench 116.

Figure 4:
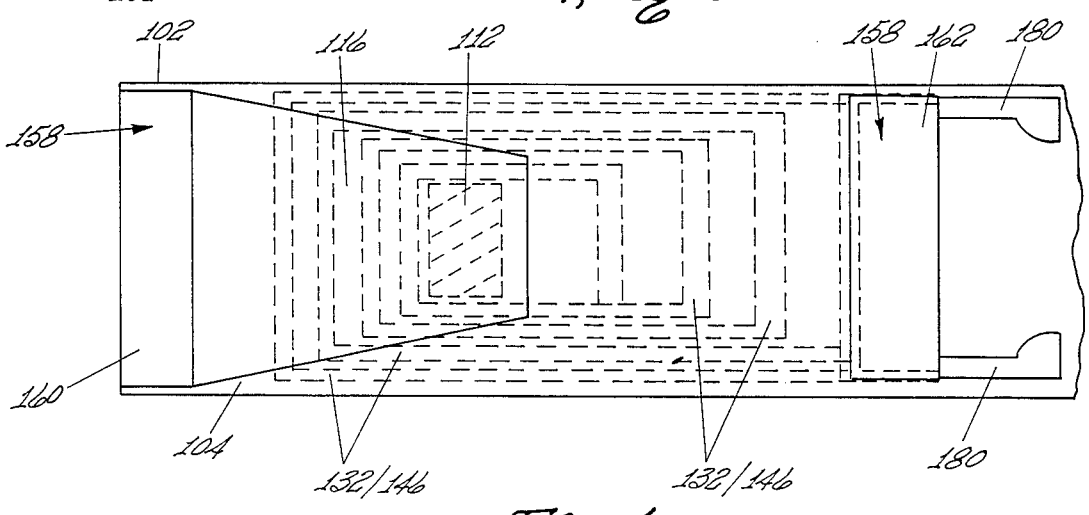
FIG. 4 is a top plan view of a thin film magnetic tape head illustrated in FIG. 3.

As illustrated in FIG. 3, during the deposition of the top pole piece, a support section 156 of the top pole piece layer 150 is deposited on top of the third photoresist layer 144 described above, the coil windings 132 which extend rearward to the location where the multiplanar coil windings 132 and 146 are electrically connected to an electrical conducting connecting means, which electrical conducting connecting means is shown as 180 as shown in FIG. 4.

A leveler layer, shown generally as 158, having a forward leveler section 160 and a rearward leveler section 162 is deposited specifically on the front gap section 152 of the top pole piece 150 and on the rearwardly located support section 156. The leveler layer 158 has a thickness which is slightly greater than the height of the step of the top pole piece 150. The forward leveler section 160 is deposited onto the front gap section 152 of the top pole piece 150 while the rearward leveler section 162 is continuously deposited onto the support section 156 of the top pole piece 150. Dashed lines 164 and 166 illustrate the commencement of the deposited leveler layer 158. The rearward leveler section 162 is located a predetermined distance from and rearward of the rear wall section 122 and rearward of the magnetic transducing gap 148 and rear magnetic closure section 128. The forward leveler section 160 and rearward leveler section 162 are adapted to receive and support a superstrate.

A superstrate, omitted from FIG. 3 for clarity, is affixed to the leveler layer 158. However (in a similar manner to superstrate 248 in FIG. 5), the structure of FIG. 3 would have a planar superstrate affixed to the leveler layer 158 by specifically attaching the same to the forward leveler section 160 and the rearward leveler section 162. Typically, the superstrate is preferably formed of the same materials as the substrate. The adhesive line, formed at the boundary of the leveler layer forward wall section 160 and the undersurface of a superstrate, is very thin, say in the order of 5 microns or less. As such, the cross-section area of the adhesive line presented to the tape engaging surface is extremely small, and will not adversely affect the abrading characteristics of the total tape engaging surface.

In FIG. 3 the tape engaging surface, when the final magnetic head assembly is ground and polished, is formed of the substrate 102, the forward gap section 108 of the bottom pole piece 104, the forward wall section 112 of the lateral layer 117, the thin gap defining portion 126 of the insulating structure 155 located in transducing gap 118, the front gap section 152 of the top pole piece 150, the forward wall section 160 of the leveler layer 158 and the thin adhesive line and superstrate (not shown in FIG. 3, but equivalent to the superstrate illustrated as element 248 in FIGS. 5 and 8).

FIG. 4 illustrates, in the top view thereof and without a superstrate, the relationship between the substrate 102, the bottom pole piece 104, the forward leveler section 160 and the rearward leveler section 162 and the coil windings 132 and 146 (shown as dashed lines). The coil windings 136 and 146 and the insulating structure enclosing the same have a portion thereof located in the coil windings receiving trench 116 and a portion thereof located over the rearwardly extending portion 129 of the bottom pole piece 104, respectively. The forward leveler section 160 and rearward leveler section 162 of the leveler layer 158 are shown as being deposited onto front gap section 152 of the top pole piece 150 (FIG. 3) and the support section 156 (FIG. 3), respectively. The support section 156 of the top pole piece 158 (FIG. 3) is deposited on the third photoresist layer 144 as noted above. The forward leveler section 160 and the rearward leveler section 162 are positioned to receive and support a superstrate.

Electrical connecting means 180 are attached to the coil windings 132 and 146 to pass electrical signals between the thin film magnetic head and an output circuit.

FIGS. 5, 6 and 7 disclose three embodiments of thin film magnetic heads that are fabricated using the teachings of this invention. As will become apparent from the following discussions, a thin film magnetic head can use be fabricated with: (i) the coil windings receiving trench and the leveler layer, as is depicted by FIG. 5; (ii) the coil windings receiving trench alone, as is depicted by FIG. 6; or (iii) the leveler layer alone, as is depicted by FIG. 7.

Specifically, FIG. 5 discloses that the substrate 200 has a bottom pole piece layer 202 that has the lateral wall section in lieu of a separate layer formed to be integral therewith which is an alternative construction. The lateral wall section is shown as 204. The lateral wall section 204 has a forward wall section 206 and a rearward wall section 208. The forward wall section 206 and the rearward wall section 208 define a coil windings receiving trench 210. The coil windings receiving trench 210, in this embodiment, encloses stacked coil windings 212 which form a part of the multiplanar coil of the magnetic head discussed in connection with FIG. 5. The coil windings 212 are encapsulated in a thick coil windings enclosing portion 216 of an insulating structure 214. The insulating structure 214 also has a thin gap defining portion 220. The thin gap defining portion 220 is deposited onto the forward wall section 206 of the lateral wall section 204.

A top pole piece layer 230 has a front gap section 232 that is located adjacent to the front gap section 234 formed on the forward wall section 206 which functions as the gap for the bottom pole piece 202. Also, the support section 246 is formed with the top pole piece 250. The front gap section 234, which is part of the bottom pole piece 202, forms one side of a magnetic transducing gap 237 and the front gap section 232 of top pole piece 230 forms the other side of the transducing magnetic gap 237. The thickness of the magnetic gap 237 is established by the thickness of the thin gap defining portion 220 of the insulating structure 214.

The top pole piece 230 bridges the forward wall section 206 of the lateral wall layer 204, which likewise is the forward wall section defining the coil winding receiving trench 210 having the thin gap defining portion 220 thereon, to the rearward wall section 208 of the lateral wall section 204 which defines the other side of the coil winding receiving trench 210. At the transducing gap 237 located on the tape engaging surface, the front gap section 232 of the top pole piece layer 230 is separated from, but is supported on, the front gap section 234 through the thin gap defining portion 220 of insulating structure 214, which establish the thickness of the transducing gap 237. However, the rear magnetic closure portion 236 of the top pole piece 230 physically contacts the rearward wall section 208 of the lateral wall 204, which is part of the bottom pole piece 202, to form a rear magnetic closure section 238 to complete the reluctance path for the magnetic flux. Thus, the rearward wall section 208 of the lateral wall layer 204 and the rearwardly extending portion 218 of the bottom pole piece 202 structurally support the rear magnetic closure portion 236 of the top pole piece 230 while concurrently serving as the rear magnetic closure section 238 for the thin film magnetic head as described above.

A leveler layer 240 having a forward leveler section 242 and a rearward leveler section 244, located rearward of lateral wall section 208, defines a leveling layer to enable a relatively planar superstrate 248 to be affixed to the assembly. The superstrate 248 does not have to be fabricated or processed in a manner to conform the same to the step of the contoured outer surface of the top pole piece 230. The rearward leveler section 244 is supported by the separate support section 246, formed as part of the top pole piece layer 236, in a manner similar to that in which the support section 162 of FIG. 3 is formed.

As a result of the above structure, a space 250, located remotely from and rearward of the transducing gap 237, is formed between the bottom of the superstrate 248 and the step of the contoured outer surface of the top pole piece 230. Typically the space 250 is filled with an insulating glue or adhesive shown as 252. The superstrate is attached to the forward leveler section 242 and the rearward leveler section 244 by means of an adhesive, such as a low temperature epoxy that has a curing temperature below the temperature which would cause a change in the magnetic characteristics of the pole pieces 202 and 230. The substrate 248 is attached to and extends between the forward leveler section 240 and the rearward leveler section 244 enclosing the step of the contoured outer surface of the top pole piece 230, it being noted that the step is remote from the tape engaging surface.

The resulting glue line, or adhesive line, located at the boundary depicted by arrow 254, has a thickness of about 5 microns or less, which is substantially less than the thickness of the adhesive and filler lines shown in FIGS. 1 and 2 of the Prior Art magnetic heads.

In the embodiment of FIG. 6, a substrate 300 has a deposited bottom pole piece 302 that has the lateral wall layer formed to be integral therewith, which is shown as lateral wall section 304. The lateral wall section 304 defines in the interior thereof a coil windings receiving trench 308. The coil windings receiving trench 308 encloses, in this embodiment, a stacked coil windings 312 which form a part of the multiplanar coil of a magnetic head similar to that discussed in connection with FIG. 3. The coil windings 312 are encapsulated in thick coil windings enclosing portion 316 of the insulating structure shown generally as 346. The thick coil windings enclosing portion 316 is part of the insulating structure 346 which includes a thin gap defining portion 320. The thin gap defining portion 320 is deposited onto the forward wall section 322 of the lateral wall section 304. The forward wall section 322 functions as one side of the transducing gap 326.

A top pole piece 330 has a front gap section 332 that is located adjacent to and spaced from the front wall section 322 of the lateral wall section 304. The width of the spacing is determined by the thin gap defining portion 320 of the insulating structure 346. The front gap section 332 of the top pole piece 330 forms the other side of the magnetic transducing gap 326. The thickness of the magnetic transducing gap 326 is controlled by controlling the thickness of the thin gap defining portion 320 of the insulating structure 346.

The top pole piece 330 bridges from the forward wall section 322, which likewise is the front section of the coil windings receiving trench 308, to the rearward wall section 338 of the lateral wall section 304. At the magnetic transducing gap 326 located on the tape engaging surface, the front gap section 332 of the top pole piece layer 330 is separated from, but is supported on, the front wall section 322 of the lateral wall section 304 through the thin gap defining portion 320 of the insulating structure 346.

The rear magnetic closure portion 336 of the top pole piece 330 physically contacts the rearward wall section 338 of the lateral wall section 304, which is integral with the bottom pole piece 302, to form a rear magnetic closure section 340 to complete the reluctance path for the magnetic flux. The rearward wall section 338 of the lateral wall section 304, supported by the bottom pole piece 302, structurally supports the rear magnetic closure portion 336 of the top pole piece 330 while concurrently serving as the rear magnetic closure section 340 for the thin film magnetic head. A protective layer 347 is provided.

The resulting adhesive line or glue line, shown as 348, is slightly thicker in dimension than that discussed in FIG. 5, and could be in the order of 5 microns or more, which is still less than the thickness of the adhesive lines shown in FIG. 1 and FIG. 2 of the prior art.

The embodiment of a thin film magnetic head assembly illustrated in FIG. 7 incorporates a thin film magnetic head transducer which is similar in construction to that illustrated as FIG. 1 and labeled as Prior Art, except that the magnetic head in FIG. 7 has a multiplanar coil windings as compared to a single coil winding. However, the thin film magnetic head assembly has a leveler layer as will be described hereinbelow.

FIG. 7 discloses that the substrate 400 has a bottom pole piece 402 having a predetermined thickness that has been deposited thereon. The bottom pole piece 402 has a front gap section 404 that defines one side of a magnetic transducing gap 406.

The stacked or multiplanar coil windings 408, which form a part of the multiplanar coil of a magnetic head, are encapsulated in thick coil windings enclosing portion 416 of an insulating structure shown generally as 456. The thick coil windings enclosing portion 416 is part of an insulating structure 456 which includes a thin gap defining portion 420. The thin gap defining portion 420 is deposited onto the front gap section 404 of the bottom pole piece 402 to define the transducing gap 406.

A deposited top pole piece 430 has a front gap section 432 which is located adjacent to the front gap section 404 of the bottom pole piece 402. The front gap section 404 of the bottom pole piece forms one side of a magnetic transducing gap 438 and the front gap section 432 of the top pole piece 430 forms the other side of the magnetic transducing gap 406. The thickness of the magnetic transducing gap 406 is established by the thickness of the thin gap defining portion 420 of the insulating structure 456.

The top pole piece 430 includes a rear magnetic closure portion 436 which physically contacts or is contiguous the rearwardly extending portion 440 of the bottom pole piece 402 to form a rear closed magnetic section 440 to complete the reluctance path for the magnetic flux.

A leveler layer 442 having a forward leveler section 444 and a rearward leveler section 446 defines a leveling means to enable a superstrate 448, having a relatively planar support surface, to be affixed to the assembly without having to conform the same to the stepped contoured outer surface of the top pole piece 430. A space 450, remote from the transducing gap 406, is formed between the bottom of the superstrate and the stepped contoured outer surface of the top pole piece 430. Typically the space 450 is filled with an insulating glue or adhesive shown as 452. The superstrate 448 is affixed to the leveler layer by means of an adhesive, having the characteristics reference above, and the resulting glue line or adhesive line, located at the boundary depicted as 454, would have a thickness of about 5 microns or less, which is substantially less than the thickness of the adhesive line shown in FIGS. 1 and 2 of the Prior Art magnetic heads. This is about the same thickness as discussed above with respect to FIG. 5.

In FIG. 8, the illustration depicts a view looking into the magnetic gap of a multitrack magnetic tape head formed from a plurality of thin film magnetic tape head assemblies shown in FIG. 5. The magnetic tape is shown to be transported in either direction shown by arrow 460. A magnetic head assembly, shown generally as 464, is separated from an adjacent, spaced aligned magnetic head assembly 466, of identical structure, by an insulating material 470.

The tape engaging surface for magnetic head 464 is defined by the substrate 200, the bottom pole piece 202, the front wall section 206 of the lateral wall section 204, the thin gap defining portion 220 of the insulating structure 214, the front gap section 232 of the top pole piece 230, the front leveler section 242 of the leveler layer 240, the glue line 234 and the superstrate 248.

In FIG. 9, the illustration depicts a view looking into the magnetic gap of a multitrack magnetic tape head formed from a plurality of thin film magnetic tape head assemblies shown in FIG. 6. The magnetic tape is shown to be transported in either direction shown by arrow 480. A magnetic head assembly, shown generally as 484, is separated from an adjacent, spaced aligned magnetic head assembly 486, of identical structure, by an insulating material 346.

The tape engaging surface for magnetic head 484 is defined by the substrate 300, the bottom pole piece 302, the lateral wall layer 304, the thin gap defining portion 320 of the insulating structure 346, the front gap section 332 of the top pole piece 330, the front edge of the bonding material layer 346, and the superstrate 342.

In FIG. 10, the illustration depicts a view looking into the magnetic gap of a multitrack magnetic tape head formed from a plurality of thin film magnetic tape head assemblies shown in FIG. 7. The magnetic tape is shown to be transported in either direction shown by arrow 500. A magnetic head assembly, shown generally as 504, is separated from an adjacent, spaced aligned magnetic head assembly 506, of identical structure, by an insulating material 510.

The tape engaging surface for magnetic head 504 is defined by the substrate 400, the front gap section 404 of the bottom pole piece 402, the thin gap defining portion 420 of the insulating structure 456, the front gap section 432 of the top pole piece 430, the front leveler section 444 of the leveler layer 442, the glue line 454 and the superstrate 448.

FIG. 11 A is pictorial representations of a deposited, thick film bottom pole piece 520 supported on a substrate 522 and having an ion beam mask 524 placed around the outer edges thereof leaving the central area 528 of the bottom pole piece layer 520 exposed. The unmasked or exposed central surface 528 is then milled using a ion beam, depicted by dashed lines 526, to controllably remove material from the central area 528 of the bottom pole piece 520 to form a lateral wall layer defining a coil windings receiving trench.

FIG. 11 B illustrates the final integral bottom pole piece layer-lateral wall layer assembly. In FIG. 11 B, the fabricated bottom pole piece 520 is supported by a substrate 522 and has a lateral wall layer section 530 integral therewith. The lateral wall section 530 defines a coil windings receiving trench 532 having the bottom enclosure defined by the bottom pole piece 520.

FIG. 12 A is pictorial representations of a deposited, thin film bottom pole piece 570 supported on a substrate 572 and having a plating mask placed 574, of an appropriate thickness, placed thereon at the central area of the bottom pole piece 570 leaving the portions 576 exposed. The unmasked areas or exposed portions 576 are then subjected to a plating solution to controllably continuously add plating material to the portions 576 of the bottom pole piece 570 to form a lateral wall layer defining a coil windings receiving trench.

FIG. 12 B illustrates the final integral bottom pole piece layer-lateral wall layer assembly. In FIG. 12 B, the integral plated bottom pole piece layer 570 supports a lateral wall section 584 having wall sections 586. The lateral wall sections 586 define a coil windings receiving trench 588 therebetween. Dashed lines 590 are shown in FIG. 12B to depict the commencement of the portion of the continuously plated or deposited lateral wall section 586 from the plated bottom pole piece layer 570.

Figure 13:
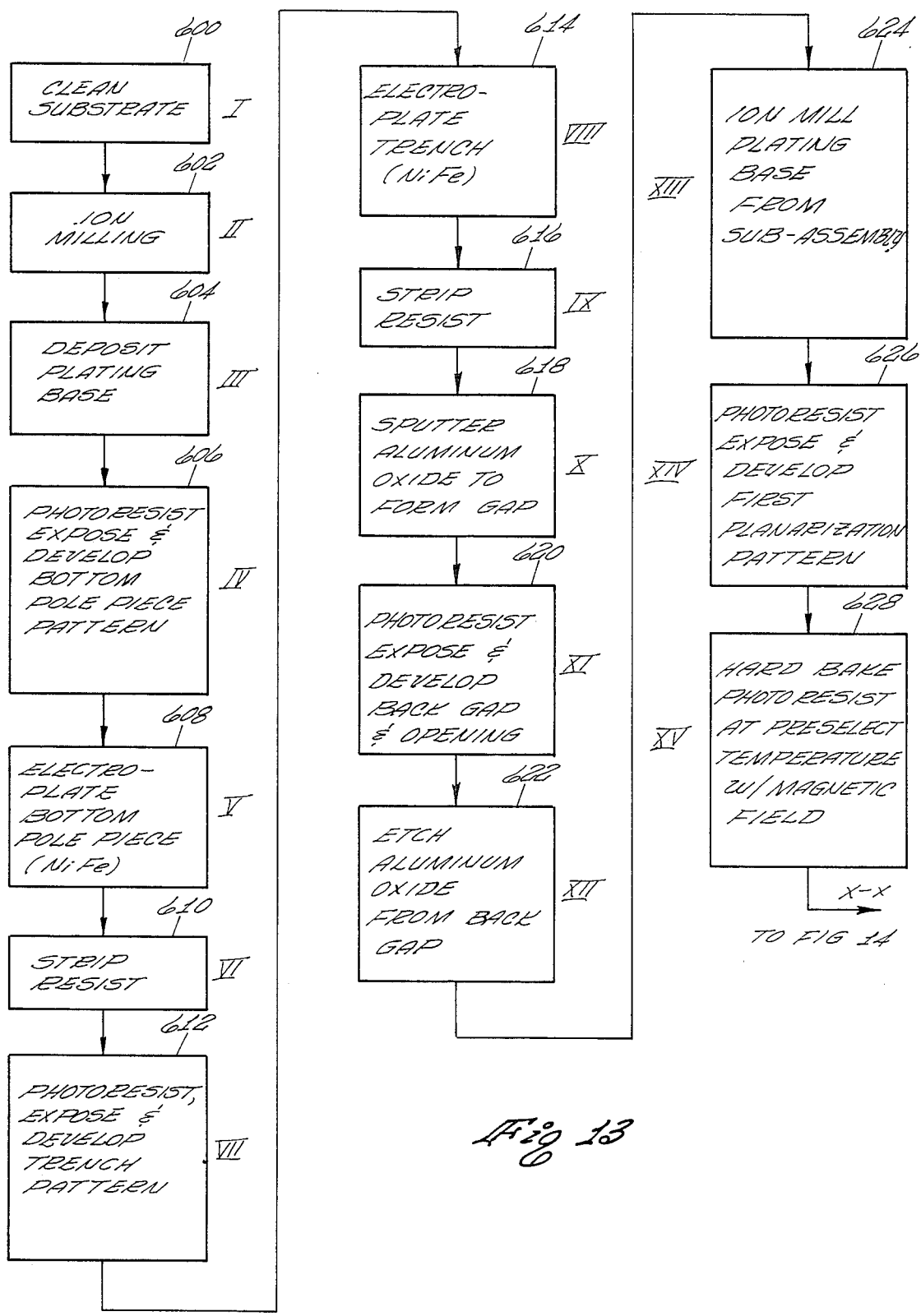
Figure 14:
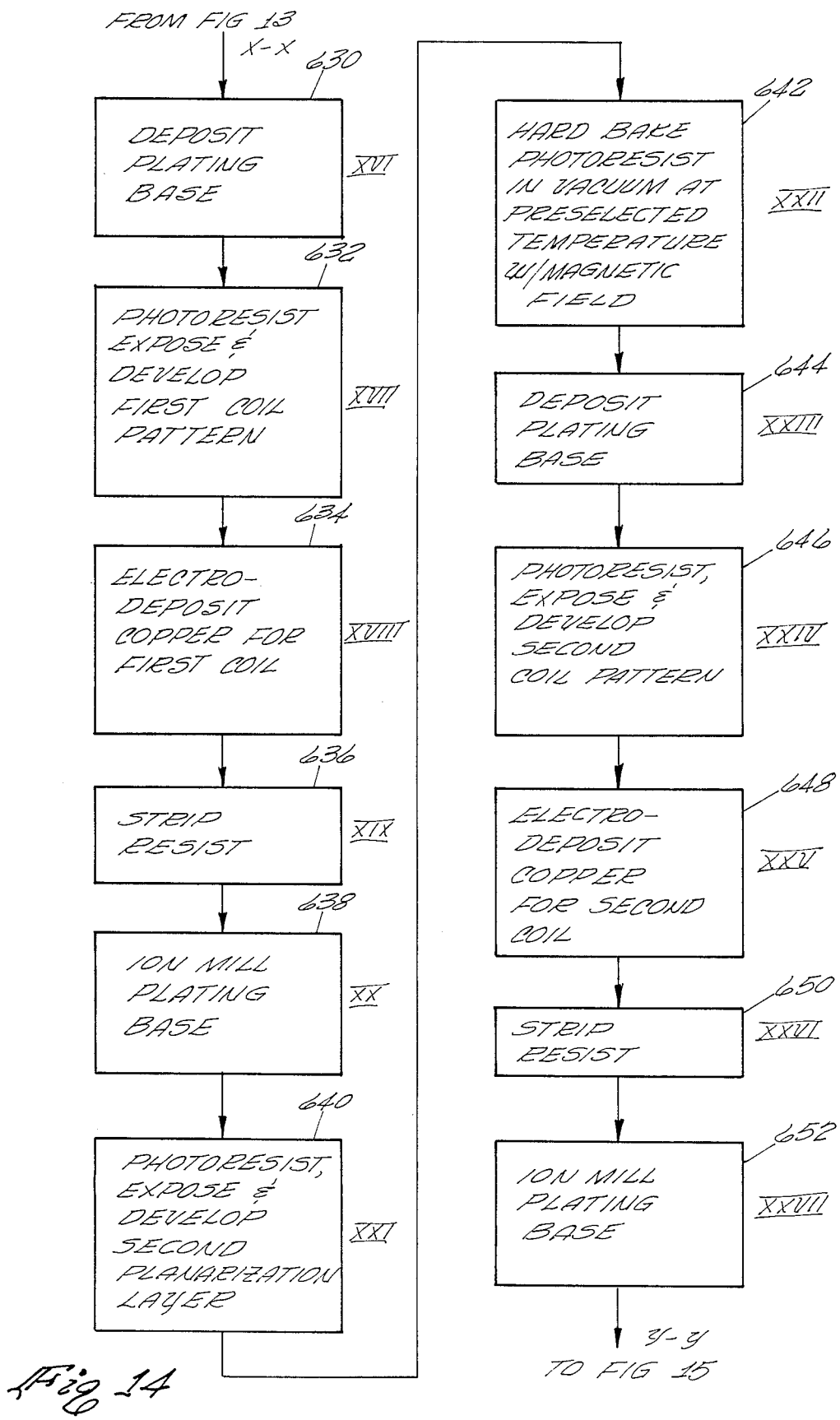

FIGS. 13, 14 and 15 depict, by means of a block diagram, the steps of a method for producing the magnetic tape head of FIG. 3. However, it is readily apparent to a person skilled in the art that certain of the steps could be omitted and/or replaced to produce other embodiments of thin film magnetic tape heads, such as for example, the thin film magnetic heads illustrated in FIGS. 5, 6 and 7, using the teaching of this invention.

In FIG. 13, the steps shown therein are:
(I) clean substrate as illustrated by box 600—This may be performed by a high pressure scrub detergent with an ionized wash under pressure to remove cleaning material or any organic matter;
(II) ion mill substrate to remove any inorganic matter as illustrated by box 602—This may be performed by use of a standard ion milling machine;
(III) deposit plating base on substrate as illustrated by box 604—This may be performed by sputtering a thin metallic layer;
(IV) photoresist, expose and develop bottom pole piece pattern as illustrated by box 606—This may be performed by using commercially available photoresist material;
(V) electroplate bottom pole piece with NiFe as illustrated by box 608—This may be performed by using an appropriate nickel-iron solution;
(VI) strip resist as illustrated by box 610—This may be performed by using commercially available stripping material;

(VII) photoresist, expose and develop trench pattern as illustrated by box 612—This may be performed by using commercially available photoresist material;

(VIII) electroplate bottom trench with NiFe as illustrated by box 614—This may be performed by using an appropriate nickel-iron solution;

(IX) strip resist as illustrated by box 616—This may be performed by using commercially available stripping material;

(X) sputter Aluminum Oxide to form gap as illustrated by box 618—This may be performed by using commercially available sputtering apparatus and a selected thickness thereof depending on the application;

(XI) photoresist, expose and develop rear magnetic closure section and opening as illustrated by box 620—This may be performed by using commercially available photoresist material;

(XII) etch Aluminum Oxide from rear magnetic closure section as illustrated by box 622—This may be performed by using commercially available chemical etching solutions;

(XIII) ion mill to remove plating base from sub-assembly as illustrated by box 624—This may be performed by use of a standard ion milling machine;

(XIV) photoresist, expose and develop first planarization pattern as illustrated by box 626—This may be performed by using commercially available photoresist material;

(XV) hard bake photoresist at preselected temperature with a magnetic field as illustrated by box 628—This may be performed by hard baking resist in a vacuum in an appropriate magnetic field;

The discussion now goes from FIG. 13 from line X—X to line X—X of FIG. 14:

(XVI) deposit plating base as illustrated by box 630—This may be performed by depositing an appropriate thin metallic layer;

(XVII) photoresist, expose and develop first coil pattern as illustrated by box 632—This may be performed by using commercially available photoresist material;

(XVIII) deposit copper for first coil as illustrated by box 634—This may be performed by electroplating copper to form first coil to a selected thickness;

(XIX) strip resist as illustrated by box 636—This may be performed by using commercially available stripping material;

(XX) ion mill plating base as illustrated by box 638—This may be performed by use of a standard ion milling machine;

(XXI) photoresist, expose and develop second planarization layer as illustrated by box 640—This may be performed by using commercially available photoresist material;

(XXII) hard bake photoresist at preselected temperature with a magnetic field as illustrated by box 642—This may be performed by hard baking resist in a vacuum in an appropriate magnetic field;

(XXIII) deposit plating base as illustrated by box 644—This may be performed by depositing an appropriate thin metallic layer;

(XXIV) photoresist, expose and develop first coil pattern as illustrated by box 646—This may be performed by using commercially available photoresist material;

(XXV) deposit copper for second coil as illustrated by box 648—This may be performed by electroplating copper to form second coil to a selected thickness;

(XXVI) strip resist as illustrated by box 650—This may be performed by using commercially available stripping material;

(XXVII) ion mill plating base as illustrated by box 652—This may be performed by use of a standard ion milling machine;

The discussion now goes from FIG. 14 from line Y—Y to line Y—Y of FIG. 15:

(XXVIII) photoresist, expose and develop third planarization layer as illustrated by box 654—This may be performed by using commercially available photoresist material;

(XXIX) hard bake photoresist at preselected temperature with a magnetic field as illustrated by box 656—This may be performed by hard baking resist in a vacuum in an appropriate magnetic field;

(XXX) deposit plating base on substrate as illustrated by box 658—This may be performed by an appropriate thin metallic layer;

(XXXI) photoresist, expose and develop top pole piece pattern as illustrated by box 660—This may be performed by using commercially available photoresist material;

(XXXII) electroplate top pole piece with NiFe as illustrated by box 662—This may be performed by using an appropriate nickel-iron solution;

(XXXIII) strip resist as illustrated by box 664—This may be performed by using commercially available stripping material;

(XXXIV) photoresist, expose and develop leveler pattern with the front gap section and support section of a pole piece layer being unmasked to receive leveler layer as illustrated by box 666—This may be performed by using commercially available photoresist material;

(XXXV) electroplate leveler layer with NiFe as illustrated by box 668—This may be performed by using an appropriate nickel-iron solution;

(XXXVI) strip resist as illustrated by box 670—This may be performed by using commercially available stripping material;

(XXXVII) ion mill plating base/top pole piece/leveler plating base as illustrated by box 672—This may be performed by use of a standard ion milling machine; and (XXXVIII) Probe test electrical resistance of transducer as illustrated by box 674—This may be performed by use of standard electrical resistance probe test apparatus.

It is envisioned that one or more of the above steps could be used with magnetic heads formed of different steps, but the process of forming the bottom pole layer having the lateral wall layer integral therewith as described in connection with FIGS. 12 A and 12 B could likewise be used to practice the teachings of this invention. Specifically, the process steps for forming the lateral wall layer, or lateral wall sections, if the same is integral with the bottom pole piece, to define a coil windings receiving trench and for forming the leveler layer can be used successfully with a wide range of thin film magnetic heads, such as for example, a read-while-write head and the like.

It is also envisioned that a person skilled in the art could utilize the product or method disclosed herein to greatly reduce the percentage of area of the so called soft abrading material in any magnetic head that is exposed to abrading on a magnetic media engaging surface such that substantially all of the media engaging surface is formed of a material that is highly resistant to being abraded by a magnetic media.

Although the preferred embodiment disclosed herein is for magnetic tape heads and magnetic tape head assemblies, the teachings hereof have equal application to other magnetic heads, such as, for example, floppy disc heads, Winchester type flying heads, or the like. The teachings hereof can be used by those skilled in the art to maximize the amount of highly resistive material that is in the magnetic media engaging path to obtain improved magnetic head operating characteristics and longer head life.

What is claimed is:

1. A thin film magnetic head comprising
    a substrate having a depositing surface wherein the substrate is highly resistive to being abraded by a magnetic media being moved thereacross;
    a bottom pole piece located on said substrate, said bottom pole piece having a front gap section and a rearwardly extending portion with the front gap section thereof positioned at a predetermined location on said substrate and with the rearwardly extending portion thereof located rearward of and extending in a spaced opposed relationship from said front gap section, a portion of the rearwardly extending portion of the bottom pole piece defining one side of a rear magnetic closure section;
    a coil having plurality of coil windings formed on said bottom pole piece and positioned a predetermined distance rearward of the front gap section thereof and having a portion of the coil windings extending therefrom rearward on the rearward section of said bottom pole piece and beyond the rear magnetic closure section;
    an insulating structure having a thin gap defining section located on the front gap section of the bottom pole piece and a coil windings enclosing section enclosing and surrounding the coil windings located on said bottom pole piece layer, the thin gap defining portion of said insulating structure being formed of predetermined thickness to establish the thickness of a magnetic transducing gap;
    a magnetic top pole piece layer having a front gap section and a contoured top surface having a step formed therein and a rear magnetic closure portion, said top pole piece layer being positioned with the front gap section thereof on said insulating structure and adjacent the front gap section of said bottom pole piece layer to form the other side of the magnetic transducing gap and with the thin gap defining portion of said insulating structure located therebetween establishing the width of the magnetic transducing gap and with the rear magnetic closure portion thereof contiguous the rearwardly extending portion of bottom pole piece layer forming a rear magnetic closure section, said top pole piece layer forming a contoured top enclosure for enclosing the coil windings enclosing portion of said insulating structure enclosing and surrounding that portion of the coil windings located a between the top pole piece and bottom pole piece; and
    a leveler layer formed of a material having abrading characteristics substantially the same as that of the magnetic top pole piece layer and having a thickness which is slightly greater than the height of the step of said top pole piece layer and having a forward leveler section located adjacent the front gap section of said top pole piece and a rearward leveler section located a predetermined distance from and rearward of the front wall section of said leveler layer and rearward of the rear magnetic closure section, the front leveler section and the rearward leveler section being adapted to receive and support a superstrate.

2. The thin film magnetic head of claim 1 further comprising
    a superstrate having a relatively planar support surface and a media engaging surface and being formed of a material which is highly resistive to being abraded by a magnetic media being moved thereacross, said superstrate having the relatively planar support surface affixed to the forward leveler section and the rearward leveler section of said leveler layer to enclose the contoured outer surface of said top pole piece defining a space located remotely from and rearward of the magnetic transducing gap.

3. A thin film magnetic head comprising
    a substrate having a depositing surface wherein the substrate is highly resistive to being abraded by a magnetic media being moved thereacross;
    a bottom pole piece located on said substrate, said bottom pole piece having a front gap section and a rearwardly extending portion with the front gap section thereof positioned at a predetermined location on said substrate and with the rearwardly extending portion thereof located rearward of and extending in a spaced opposed relationship from said front gap section, a portion of the rearwardly extending portion of the bottom pole piece defining one side of a rear magnetic closure section;
    a coil having plurality of coil windings formed on said bottom pole piece and positioned a predetermined distance rearward of the front gap section thereof and having a portion of the coil windings extending therefrom rearward on the rearward section of said bottom pole piece and beyond the rear magnetic closure section;
    an insulating structure having a thin gap defining section located on the front gap section of the bottom pole piece and a coil windings enclosing section enclosing and surrounding the coil windings located on said bottom pole piece layer, the thin gap defining portion of said insulating structure being formed of predetermined thickness to establish the thickness of a magnetic transducing gap;
    a magnetic top pole piece layer having a front gap section and a contoured top surface having a step formed therein and a rear magnetic closure portion, said top pole piece layer being positioned with the front gap section thereof on said insulating structure and adjacent the front gap section of said bottom pole piece layer to form the other side of the magnetic transducing gap and with the thin gap defining portion of said insulating structure located therebetween establishing the width of the magnetic transducing gap and with the rear magnetic closure portion thereof contiguous the rearwardly extending portion of bottom pole piece layer forming a rear magnetic closure section, said top pole piece layer forming a contoured top enclosure for enclosing the coil windings enclosing portion of said insulating structure enclosing and surrounding that portion of the coil windings located a between the top pole piece and bottom pole piece; and a leveler layer having a thickness which is slightly greater than the height of the step of said top pole piece layer and having a forward leveler section located adjacent the front gap section of said top pole piece and a rearward leveler section located a predetermined distance from and rearward of the front wall section of said leveler layer and rearward of the rear magnetic closure section, the front leveler section and the rearward leveler section being adapted to receive and support a superstrate; and a superstrate having a relatively planar support surface and a media engaging surface and being formed of a material which is highly resistive to being abraded by a magnetic media being moved thereacross, said superstrate having the relatively planar support surface affixed to the forward leveler section and the rearward leveler section of said leveler layer to enclose the contoured outer surface of said top pole piece defining a space located remotely from and rearward of the magnetic transducing gap and wherein the space between the relatively planar support surface of said superstrate and the contoured outer surface of said top pole piece is filled with an adhesive material.

4. The thin film magnetic head of claim 3 wherein the the relatively planar support surface is affixed to the front leveler section and the rear leveler section with a low temperature epoxy.

5. The thin film magnetic head of claim 3 wherein the portion of said coil windings located between the bottom pole piece and the top pole piece is encapsulated with an electrically insulating material.

6. A thin film magnetic tape head assembly comprising a substrate having a depositing surface and an end surface which is substantially perpendicular to the support surface, said substrate being formed of a material which is highly resistive to being abraded by a magnetic tape being moved thereacross, said substrate having a tape engaging surface defined at a predetermined position on the end surface;

a magnetic bottom pole piece layer located on the support surface of said substrate, said bottom pole piece layer having a front gap section which defines one side of a magnetic transducing gap and a rearwardly extending portion with the front gap section thereof positioned adjacent the end defining the tape engaging surface and with the rearwardly extending portion thereof located rearward of and in a spaced opposed relationship from said front gap section and the tape engaging surface for defining a closed rear magnetic gap;

a multiplanar coil having coil windings formed on said bottom pole piece layer with a portion of the coil windings located a predetermined distance from the front gap section of the bottom pole piece layer with the remaining portion of the coil windings extending to the rearward section of said bottom pole piece layer;

an insulating structure having a thin gap defining section and a coil windings enclosing section located on said bottom pole piece layer, the thin gap defining portion of said insulating structure being formed of predetermined thickness to establish the thickness of a magnetic transducing gap and being positioned on the front gap section of said bottom pole piece layer and with the coil windings enclosing portion extending therefrom to enclose and surround that portion of the coil windings located a predetermined distance from the forward gap section of said bottom pole piece layer;

a magnetic top pole piece layer having a front gap section and a contoured top surface having a step formed therein and a rearward magnetic closure portion, said top pole piece layer being positioned with the front gap section thereof on said insulating structure and adjacent the front gap section of said bottom pole piece layer to form the other side of the magnetic transducing gap with the thin gap defining portion of said insulating structure located therebetween establishing the width of the magnetic transducing gap and with the rearward magnetic closure portion thereof contiguous the rearwardly extending portion of the bottom pole piece layer forming a rear magnetic closure portion, said top pole piece layer forming a contoured top enclosure for enclosing the coil windings enclosing portion of said insulating structure enclosing and surrounding that portion of the coil windings located a predetermined distance from the front gap section of said bottom pole piece layer; and a leveler layer formed of a material having abrading characteristics substantially the same as that of the magnetic top pole piece layer and having a thickness which is slightly greater than the height of the step of said top pole piece layer and having a forward leveler section located adjacent the front gap section of said top pole piece and a rearward leveler section located a predetermined distance from and rearward of the front wall section of said leveler layer and rearward of the rear magnetic closure section, the front leveler section and the rearward level section being adapted to receive and support a superstrate.

7. The thin film magnetic tape head assembly of claim 6 further comprising a superstrate having a relatively planar support surface and a tape engaging surface and being formed of a material which is highly resistive to being abraded by a magnetic tape being moved thereacross, said superstrate having the relatively planar support surface affixed to the forward leveler section and the rearward leveler section of said leveler layer to enclose the contoured outer surface of said top pole piece layer defining a space remotely from and rearward of the magnetic transducer gap.

8. A thin film magnetic tape head assembly comprising a substrate having a depositing surface and an end surface which is substantially perpendicular to the support surface, said substrate being formed of a material which is highly resistive to being abraded by a magnetic tape being moved thereacross, said substrate having a tape engaging surface defined at a predetermined position on the end surface;

a magnetic bottom pole piece layer located on the support surface of said substrate, said bottom pole piece layer having a front gap section which defines one side of a magnetic transducing gap and a rearwardly extending portion with the front gap section thereof positioned adjacent the end defining the tape engaging surface and with the rearwardly extending portion thereof located rearward of and in a spaced opposed relationship from said front gap section and the tape engaging surface for defining a closed rear magnetic gap;

a multiplanar coil having coil windings formed on said bottom pole piece layer with a portion of the coil windings located a predetermined distance from the front gap section of the bottom pole piece layer with the remaining portion of the coil windings extending to the rearward section of said bottom pole piece layer;

an insulating structure having a thin gap defining section and a coil windings enclosing section located on said bottom pole piece layer, the thin gap defining portion of said insulating structure being formed of predetermined thickness to establish the thickness of a magnetic transducing gap and being positioned on the front gap section of said bottom pole piece layer and with the coil windings enclosing portion extending therefrom to enclose and surround that portion of the coil windings located a predetermined distance from the forward gap section of said bottom pole piece layer;

a magnetic top pole piece layer having a front gap section and a contoured top surface having a step formed therein and a rearward magnetic closure portion, said top pole piece layer being positioned with the front gap section thereof on said insulating structure and adjacent the front gap section of said bottom pole piece layer to form the other side of the magnetic transducing gap with the thin gap defining portion of said insulating structure located therebetween establishing the width of the magnetic transducing gap and with the rearward magnetic closure portion thereof contiguous the rearwardly extending portion of the bottom pole piece layer forming a rear magnetic closure portion, said top pole piece layer forming a contoured top enclosure for enclosing the coil windings enclosing portion of said insulating structure enclosing and surrounding that portion of the coil windings located a predetermined distance from the front gap section of said bottom pole piece layer;

a leveler layer having a thickness which is slightly greater than the height of the step of said top pole piece layer and having a forward leveler section located adjacent the front gap section of said top pole piece and a rearward leveler section located a predetermined distance from and rearward of the front wall section of said leveler layer and rearward of the rear magnetic closure section, the front leveler section and the rearward level section being adapted to receive and support a superstrate; and a superstrate having a relatively planar support surface and a tape engaging surface and being formed of a material which is highly resistive to being abraded by a magnetic tape being moved thereacross, said superstrate having the relatively planar support surface affixed to the forward leveler section and the rearward leveler section of said leveler layer to enclose the contoured outer surface of said top pole piece layer defining a space remotely from and rearward of the magnetic transducer gap and wherein the space between the relatively planar support surface of the superstrate and the contoured outer surface having a step formed therein of said top pole piece layer is filled with an adhesive material.

* * * * *